Figure 1:
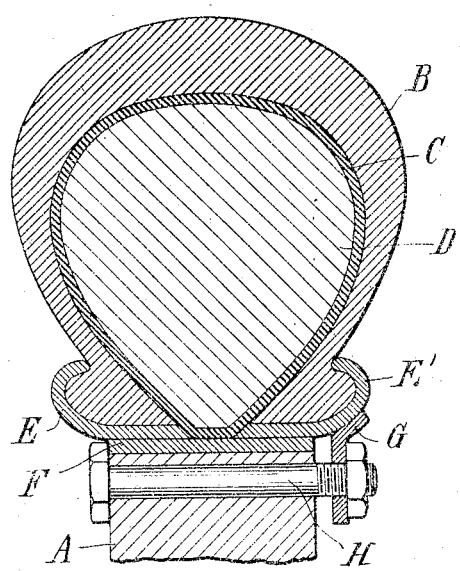

O. A. PARKER.
MEANS FOR SECURING RESILIENT TIRES TO VEHICLE WHEELS.
APPLICATION FILED NOV. 21, 1907. RENEWED FEB. 19, 1916.

1,205,657.

Patented Nov. 21, 1916.
2 SHEETS—SHEET 1.

Witnesses:
Raphaël Netter
L. S. Dunham

Orrel A. Parker, Inventor
By his Attorneys
Kerr, Page & Cooper

UNITED STATES PATENT OFFICE.

ORREL A. PARKER, OF NEW YORK, N. Y.

MEANS FOR SECURING RESILIENT TIRES TO VEHICLE-WHEELS.

1,205,657.  Specification of Letters Patent.  Patented Nov. 21, 1916.

Application filed November 21, 1907, Serial No. 403,143. Renewed February 19, 1916. Serial No. 79,468.

*To all whom it may concern:*

Be it known that I, ORREL A. PARKER, a citizen of the United States, residing at New York, in the county and State of New York, have invented certain new and useful Improvements in Means for Securing Resilient Tires to Vehicle-Wheels, of which the following is a specification, reference being had to the drawings accompanying and forming part of the same.

My invention relates to the fastening of resilient tires on wheel rims, more particularly tires comprising a casing filled with an elastic solid medium, usually substantially incompressible. Such medium is in the liquid state when first compounded, and in that condition is injected into the casing, after which it "sets" to a rubber-like consistency of great resiliency and marked durability. This medium, referred to in the claims hereto annexed as a "filling member", "filling", and "a filler", does not possess in itself sufficient rigidity to properly support the desired loads. Tires of this kind are used in considerable numbers, with notable success, being practically as resilient as pneumatic tires and affording freedom from the annoyance of leaks and "punctures."

In constructing a tire of the kind mentioned, the filling medium is injected into the casing under sufficient pressure to give as nearly as possible the desired tension on the casing. The filling medium having once set, however, if it is found that the tire is too "hard", the only method now in use for softening the tire is to remove a sufficient quantity, usually very slight, of the filling, at suitable points. On the other hand, if the tire is too "soft" when completed or if from any cause it afterward becomes too soft, it is necessary to inject a small quantity of fresh filling medium into the casing, until the desired tension is obtained. But both these operations require special tools and skill, usually not available to the ordinary user of the tires. Furthermore, the removal of such a tire from the rim is a matter of some difficulty, and also requires special tools and skill; so that a damaged or worn out tire ordinarily cannot be replaced on the road, where such replacement may be desirable. Instead, the entire wheel must usually be returned to the factory for the desired new tire or for the necessary repairs. Again, it is practically essential, to the best results, that the casing of such a tire be filled on the wheel, since the casings, even supposedly of the same dimensions, vary in size when new and particularly after use; so that to fill the casing or inner tube off the wheel at just the pressure proper for the desired tension after the filled tire is placed on the rim is practically impossible. Hence filled casings or inner tubes cannot be furnished to be placed on the wheels by the user himself, and a person desiring such tires on his vehicle must therefore forward the wheels themselves to the factory for equipment.

It will accordingly be seen that there is a pronounced need for a wheel-rim which will permit ready removal and replacement of a filled tire, and by which the tire can be made harder or softer at will.

I have therefore been led to devise my present invention, which has for its chief object to provide a rim construction which will permit the tire to be easily removed and replaced and by which the tire can be made harder or softer, that is, can be "inflated" or "deflated", as desired.

My invention is capable of various embodiments, but in carrying out the same in the preferred manner I provide a flanged rim, of which at least one flange is removable, thereby permitting the tire to be readily slipped on or off the other portion of the rim. At the same time, means are provided for adjusting the removable portion toward or from the other. The effect of forcing the adjustable flange toward the other is to contract the base of the tire, thereby drawing the outer casing more tightly about the filling medium and correspondingly increasing the tension or hardness of the tire; while adjusting the movable flange in the opposite direction permits the base of the tire to expand and loosens the outer casing, thereby making the tire correspondingly softer.

Figure 2:
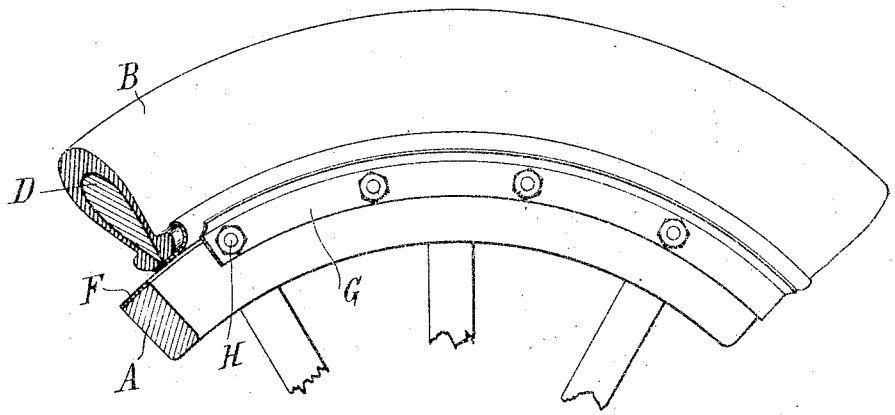
Figure 3:
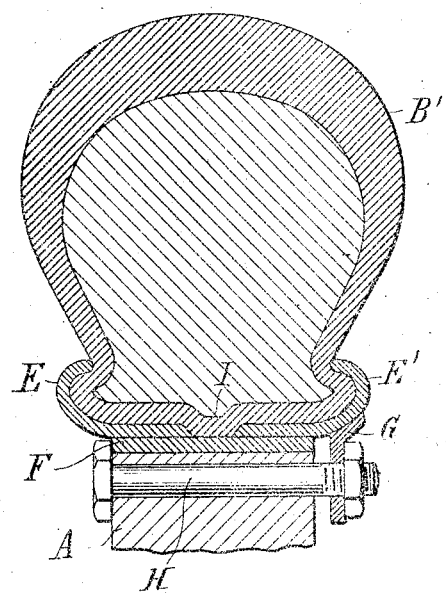
Figure 4:
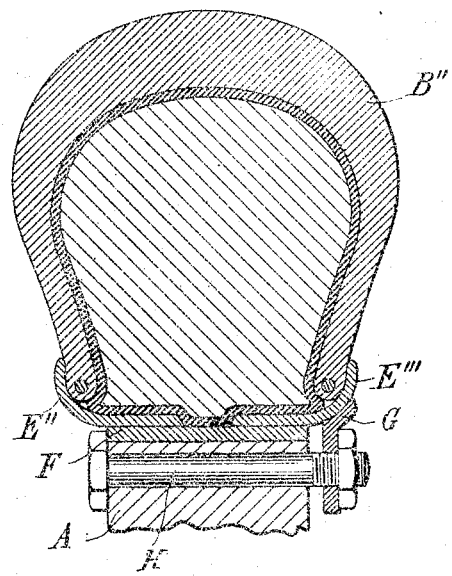

Referring now to the drawing, Figure 1 is a cross section of the preferred embodiment of the invention, showing it in use with an inner tube tire of the so-called "clencher" type. Fig. 2 is a side view of the same. Fig. 3 is a cross section showing the invention used with a novel form of "clencher" tire. Fig. 4 is a cross section showing the invention employed with a tire of the so-called "Dunlop" type.

The felly of the wheel is designated by A. Thereon is secured the rim, portions of which at the side edges thereof are formed to coöperate with the base of the tire to hold or bind the same on the rim. In Figs. 1 and 2, the coöperating portions of the rim are in the form of radial flanges of the "clencher" type, but other types of flanges may be used, as is more fully explained hereinafter.

The tire shown in Figs. 1 and 2 comprises an outer casing or "shoe" B, and "inner tube" C, and a filling of resilient material D in the latter. The outward pressure of the filling is of course exerted in large part in forcing the edges of the outer casing into the coöperating flanges of the rim.

The rim itself is in two-parts, as shown, one of which has the flange E and the other the flange E'. The former is fastened to the felly, either directly or, as is in general preferable, to a band F fixed to the felly and in effect forming a part thereof. The other member of the rim, having the flange E', is movable laterally on the band toward or from the fixed member.

Bearing against the flange E', or, if desired, fastened thereto, is a stiff unyielding binding member or members, preferably a stiff unyielding ring G, spaced slightly from the felly to permit adjustment toward the same. Extending through the ring and the felly are binding or clamping bolts H, the heads of which overlap or engage the band F to prevent any possible displacement thereof relative to the felly when the bolt-nuts are set up. The effect of the clamping ring G is to hold the adjustable member of the rim against outward displacement, and, when the bolts are tightened, to force the said member positively toward the other, thereby compressing the base of the tire. This narrowing of the base of the tire draws the outer casing more tightly around the filled inner tube and correspondingly increases the tension or hardness of the tire. On the other hand, loosening the bolts H permits the base of the tire to expand, thereby relieving the tension of the outer casing on the filling medium and making the tire correspondingly softer.

Fig. 3 shows the rim devices used with a single-tube tire of the clencher type. In this tire the casing B' is continuous instead of divided and the compression of the base by the inward adjustment of the rim member E' may produce a slight wrinkle or fold in the casing as indicated at I, between the rim members.

Fig. 4 shows the rim devices used with a tire of the so-called "Dunlop" type, in which the edges of the outer casing B'' are inextensible. For this form of tire the rim flanges preferably are not hooked but are formed as shown at E'' and E''' so as to provide secure bearing against the outwardly pressing edges of the casing B''. Here, as in the other figures, adjustment of the flange E''' contracts the base of the tire or permits it to expand, thereby hardening or softening the tire as the case may be.

In all of the forms illustrated a slight adjustment of the movable flange is sufficient to produce a marked effect on the tension of the tire. Such adjustment can be made by any user, with no other tool than a simple wrench. The user is also able to remove and replace the tire so that the complete tire, filled and ready for use, or a filled inner tube, can be furnished by the maker and placed on the wheel by the user. On the other hand, while the invention is of special advantage with filled tires, it is plain that pneumatic tires can be used therewith if desired.

What I claim is:

1. The combination, with a resilient tire comprising an outer casing and a filling member not possessing in itself sufficient rigidity to properly support the desired loads, of spaced retaining members constructed to engage the base of the tire laterally to hold the tire in place, and means for varying the space between said retaining members to produce contraction or expansion of the base of the tire as desired, whereby the outer casing can be bound around the filling member as tightly or loosely as desired, to vary the tension or hardness of the tire.

2. The combination, with a resilient tire comprising an outer casing and a filling member not possessing in itself sufficient rigidity to properly support the desired loads, of spaced retaining flanges engaging the base of the tire to hold the tire in place, and means for varying the space between said flanges, whereby the outer casing can be bound around the filling member as tightly or loosely as desired, to vary the tension or hardness of the tire.

3. The combination, with a resilient tire comprising an outer casing and a filling member not possessing in itself sufficient rigidity to properly support the desired loads, of fixed and adjustable retaining members engaging the base of the tire to hold the tire in place, and means for securing the adjustable member in adjusted position relative to the fixed member, whereby the outer casing can be bound around the filling member as tightly or loosely as desired, to vary the tension or hardness of the tire.

4. The combination, with a resilient tire comprising a casing and a filling not having in itself sufficient rigidity to properly support the desired loads, of a rim having members constructed to engage the base of the tire at the sides thereof, and means for adjusting one of said members toward and from the other, whereby the casing of the tire can be bound tightly or loosely around the filling with the degree of tightness desired.

5. The combination, with a resilient tire comprising a casing and a filling not having in itself sufficient rigidity to properly support the desired loads, of a wheel rim engaging the tire and having an adjustable member adapted to bind the said casing tightly or loosely about the filling with the degree of tightness desired.

6. The combination, with a resilient tire comprising a casing and a filling not having in itself sufficient rigidity to properly support the desired loads, of a wheel rim having side flanges engaging the base of the tire laterally to hold the tire in place, and means for adjusting one of said flanges toward and from the other to bind the casing about the filling with the degree of tightness desired.

7. The combination, with a wheel rim comprising two parts each having a tire engaging flange and a tire comprising a casing and a filling not possessing in itself sufficient rigidity to properly support the desired loads, the filling exerting pressure on the casing and causing the sides of the casing at the base to bear against the flanges of the rim, of means for adjusting one rim-part toward the other against the pressure exerted on the tire casing and the rim-flanges by the tire filling material.

8. A tire comprising an elastic filler or filling member which has not in itself sufficient rigidity to properly support the desired loads, means including an outer casing for inclosing the filler, and means for drawing the outer casing tightly about the filler to compress and support the same, the parts being so proportioned that the means for drawing the casing is ordinarily capable when the tire is in use of further adjustment to compensate for shrinkage of the filler or stretching of the cover or to vary the hardness of the tire.

9. The process of producing a working rigidity and pressure in a tire which has a filler or filling member and a flexible cover not possessing in themselves sufficient rigidity to properly support the desired loads, which consists in drawing the cover more closely about the filler until the necessary pressure and rigidity are developed.

10. The combination of a resilient tire comprising an outer incasing member and a filling member not possessing in itself sufficient rigidity to properly support the desired loads, and means for adjusting the outer incasing member upon the filling member thereby to vary the tension or hardness of the tire as desired.

11. A tire comprising a filler or filling member which has not in itself sufficient rigidity to properly support the desired loads, means including an outer incasing member for inclosing the filler or filling member, and means for drawing the outer incasing member tightly about the filler or filling member to compress and support the same, the parts being so proportioned that the means for drawing the incasing member is ordinarily capable, when the tire is in use, of further adjustment to compensate for shrinkage of the filler or filling member or to vary the load supporting capacity of the tire.

ORREL A. PARKER.

Witnesses:
S. S. DUNHAM,
M. LAWSON DYER.